United States Patent
Yamakawa et al.

(10) Patent No.: US 7,765,217 B2
(45) Date of Patent: Jul. 27, 2010

(54) SYSTEM AND METHOD FOR MANAGING AND ARRANGING DATA BASED ON AN ANALYSIS OF TYPES OF FILE ACCESS OPERATIONS

(75) Inventors: Satoshi Yamakawa, Tokyo (JP); Takashi Torii, Tokyo (JP); Yoshihiro Kajiki, Tokyo (JP)

(73) Assignee: NEC Corporation, Tokyo (JP)

( * ) Notice: Subject to any disclaimer, the term of this patent is extended or adjusted under 35 U.S.C. 154(b) by 380 days.

(21) Appl. No.: 11/305,142

(22) Filed: Dec. 16, 2005

(65) Prior Publication Data

US 2006/0149748 A1   Jul. 6, 2006

(30) Foreign Application Priority Data

Dec. 16, 2004   (JP)   ............................. 2004-364952

(51) Int. Cl.
   *G06F 17/30* (2006.01)
(52) U.S. Cl. .................. 707/751; 707/782; 707/831
(58) Field of Classification Search ............... 707/751, 707/782, 831
   See application file for complete search history.

(56) References Cited

U.S. PATENT DOCUMENTS

| | | | | |
|---|---|---|---|---|
| 5,313,631 | A * | 5/1994 | Kao | 707/204 |
| 5,367,698 | A * | 11/1994 | Webber et al. | 709/203 |
| 5,537,585 | A * | 7/1996 | Blickenstaff et al. | 707/205 |
| 6,275,898 | B1 * | 8/2001 | DeKoning | 711/114 |
| 6,393,418 | B1 * | 5/2002 | Hikita et al. | 707/7 |
| 6,442,585 | B1 * | 8/2002 | Dean et al. | 718/108 |
| 6,751,612 | B1 * | 6/2004 | Schuetze et al. | 707/4 |
| 6,938,039 | B1 * | 8/2005 | Bober et al. | 707/8 |
| 7,107,421 | B2 * | 9/2006 | Kaneda et al. | 711/162 |
| 7,127,558 | B2 * | 10/2006 | Honda et al. | 711/114 |

(Continued)

FOREIGN PATENT DOCUMENTS

JP   2003-203029   7/2003

(Continued)

OTHER PUBLICATIONS

Katsurashima Wataru, "Design and Evaluation of CIFS Server Virtualization", IEIC Technical Report, Jul. 29, 2003, pp. 73-78,vol. 103, No. 248, The Institute of Electronics, Information and Communication Engineers, Japan.

*Primary Examiner*—John R. Cottingham
*Assistant Examiner*—James E Richardson
(74) *Attorney, Agent, or Firm*—Scully, Scott, Murphy & Presser, P.C.

(57) ABSTRACT

Each of the sites interconnected to one another through a wide area network includes at least one client, a switch device logically disposed between the client and at least one server including a storage device, for providing to the client a file access virtually unifying of a plurality of storage devices, and an analysis device connected to the switch device. The switch device takes log information on the file access from the client. The analysis device determines data to be migrated to the server in a site to which the client belongs or the server in a site in vicinity of the site to which the client belongs, and commands the switch device to migrate the data. The switch device migrates the data based on the command from the analysis device.

11 Claims, 14 Drawing Sheets

U.S. PATENT DOCUMENTS

| | | | |
|---|---|---|---|
| 7,146,477 B1 * | 12/2006 | Strongin et al. | 711/163 |
| 7,430,637 B2 * | 9/2008 | Mikami | 711/118 |
| 2001/0027491 A1 * | 10/2001 | Terretta et al. | 709/238 |
| 2002/0133491 A1 * | 9/2002 | Sim et al. | 707/10 |
| 2002/0138559 A1 * | 9/2002 | Ulrich et al. | 709/203 |
| 2003/0046357 A1 * | 3/2003 | Doyle et al. | 709/214 |
| 2003/0115218 A1 * | 6/2003 | Bobbitt et al. | 707/200 |
| 2004/0111417 A1 * | 6/2004 | Goto et al. | 707/10 |
| 2004/0143832 A1 * | 7/2004 | Yamamoto et al. | 717/174 |
| 2004/0221019 A1 * | 11/2004 | Swildens et al. | 709/217 |
| 2005/0033757 A1 * | 2/2005 | Greenblatt et al. | 707/100 |

FOREIGN PATENT DOCUMENTS

| | | |
|---|---|---|
| JP | 2003-296151 | 10/2003 |
| JP | 2004-54607 | 2/2004 |
| JP | 2004-295457 | 10/2004 |
| JP | 2004-348495 | 12/2004 |

* cited by examiner

FIG. 3

```
[POINT]
    READ  →  0.1
    WRITE →  1

[WEIGHT]
    0-3 Days   →  ×1000
    4-7 Days   →  ×100
    8-30 Days  →  ×10
    1-3 Months →  ×1

[CONDITION OF FILE TARGETED FOR MIGRATION]
    >10000 Points

[EXECUTION TIME]
    EVERY DAY 1:00-5:00
                                    RULE
```

USER NAME: User A        ANALYSIS RESULT    501

| PATHNAME | NAME OF SERVER OF TRANSMITTING DESTINATION | POINT |
|---|---|---|
| /test/test3 | Server A | 11001 |
| /test/test2 | Server A | 102 |
| /test/test1 | Server A | 100 |
| /Dir/File3 | Server B | 2015 |
| /Dir/File4 | Server B | 15002 |
| /Dir/File5 | Server B | 5350 |
| /Dir/File1 | Server B | 3404 |
| /sample/sample5 | Server A | 9300 |
| /sample/sample1 | Server A | 8500 |
| /sample/sample2 | Server A | 9200 |

FIG. 5

```
[POINT]
    READ  → 0.1
    WRITE → 1

[WEIGHT]
    0-3 Days   → ×1000
    4-7 Days   → ×100
    8-30 Days  → ×10
    1-3 Months → ×1

[CONDITION OF FILE TARGETED FOR MIGRATION]
    >25000 Points

[EXECUTION TIME]
    EVERY DAY 1:00-5:00
                                    RULE
```
~502

FIG. 6

USER NAME: User A      ANALYSIS RESULT  503

| PATHNAME | NAME OF SERVER OF TRAN-SMITTING DESTINATION | POINT |
|---|---|---|
| /test | Server A | 11203 |
| /Dir | Server B | 25771 |
| /sample | Server A | 27000 |

FIG. 7

```
[POINT]
    READ  → 0.1
    WRITE → 1

[WEIGHT]
    0-3 Days   → ×1000
    4-7 Days   → ×100
    8-30 Days  → ×10
    1-3 Months → ×1

[CONDITION OF FILE TARGETED FOR MIGRATION]
    >10000 Points

[EXECUTION TIME]
    EVERY DAY 1:00-5:00

[GROUP]
    SITE A  User A, User B
                                    RULE
```

USER NAME: User A　　　　　　　　　　　　　ANALYSIS RESULT　　505

| PATHNAME | NAME OF SERVER OF TRANSMITTING DESTINATION | POINT |
| --- | --- | --- |
| /test/test3 | Server A | 11001 |
| /Dir/File3 | Server B | 2015 |
| /Dir/File4 | Server B | 15002 |
| /Dir/File5 | Server B | 5350 |
| /Dir/File1 | Server B | 3404 |
| /sample/sample5 | Server B | 512 |
| /sample/sample1 | Server B | 11329 |

USER NAME: User B　　　　　　　　　　　　　ANALYSIS RESULT　　506

| PATHNAME | NAME OF SERVER OF TRANSMITTING DESTINATION | POINT |
| --- | --- | --- |
| /Dir/File3 | Server B | 7947 |
| /Dir/File5 | Server B | 5900 |
| /sample/sample2 | Server B | 15023 |

FIG. 9

GROUP NAME: SITE A        ANALYSIS RESULT

| PATHNAME | NAME OF SERVER OF TRANS-MITTING DESTINATION | POINT |
|---|---|---|
| /test/test3 | Server A | 11001 |
| /Dir/File3 | Server B | 9962 |
| /Dir/File4 | Server B | 15002 |
| /Dir/File5 | Server B | 11250 |
| /Dir/File1 | Server B | 3404 |
| /sample/sample5 | Server B | 512 |
| /sample/sample1 | Server B | 11329 |
| /sample/sample2 | Server B | 15023 |

FIG. 10

```
[POINT]
    READ  → 0.1
    WRITE → 1

[WEIGHT]
    0-3 Days    → ×1000
    4-7 Days    → ×100
    8-30 Days   → ×10
    1-3 Months  → ×1

[CONDITION OF FILE TARGETED FOR MIGRATION]
    >25000 Points

[EXECUTION TIME]
    EVERY DAY 1:00~5:00

[GROUP]
    SITE A  User A, User B
                                    RULE
```

GROUP NAME: SITE A      ANALYSIS RESULT

| PATHNAME | NAME OF SERVER OF TRANS-MITTING DESTINATION | POINT |
|---|---|---|
| /test | Server A | 11001 |
| /Dir | Server B | 39618 |
| /sample | Server B | 26864 |

FIG. 13

GROUP NAME: SITE B          ANALYSIS RESULT

| PATHNAME | NAME OF SERVER OF TRANS-MITTING DESTINATION | POINT |
|---|---|---|
| /test | Server A | 58001 |
| /Dir | Server B | 1012 |
| /sample | Server B | 35864 |

SYSTEM AND METHOD FOR MANAGING AND ARRANGING DATA BASED ON AN ANALYSIS OF TYPES OF FILE ACCESS OPERATIONS

FIELD OF THE INVENTION

The present invention relates to a data rearrangement technique in a plurality of storage devices. More specifically, the invention relates to a data arrangement management method, a data arrangement management system, a data arrangement management device, and a data arrangement management program for determining the storage location of a file or a directory, using communication information exchanged between a client and a server as an information source.

BACKGROUND OF THE INVENTION

As means for sharing data in a centralized storage resource among a plurality of clients, a remote file access service through a de facto standard protocol such as NFS (Network File System) or CIFS (Common Internet File System) can be pointed out. As server devices that use the protocol, there are NAS (Network Attached Storage), a file server, and the like. Using the above mentioned protocol, connection with various clients has become possible.

A common feature of these devices is that these devices do not have a standardized mechanism for performing interconnection among a plurality of the devices to make mutual access to one another's storage resources of the devices, so that file access service provided to a client is limited to storage resources managed by NAS or the server itself.

In Patent Documents 1 and 2, there are disclosed a system in which a switch is introduced into a network between a client and a file server such as NAS a switch device. The switch has a function of changing part of information in a packet to transfer the packet using interpretation of the industrial standard file access protocol such as NFS and CFS. The system is equipped with a function of providing to the client a plurality of server storage resources as if they were one storage resource without introducing special software and hardware into the client and the server. Further, by using the function of data migration (rearrangement) between the servers, reduction of a management operation such as addition of the file server or replacement has become possible.

As other means for sharing the data in the centralized storage resource among the clients, service of providing contents dedicated for reading only by a Web server or the like can be pointed out. Generally, in the provision of data on the contents by the Web server, data reading by the client in a remote place has also become possible through the Internet. Normally, compared with a case where data in a local area is accessed, its response time is longer. Then, an approach is employed in which by arranging a cache server for temporarily storing data once accessed by the client in the vicinity of the installed location of the client, high-speed data reading comparable to that of the data disposed in the local area can be implemented by the client, and a delay resulting from an access to data in the remote place is reduced.

[Patent Document 1]
JP Patent Kokai Publication No. JP-P-2003-203029A
[Patent Document 2]
JP Patent Kokai Publication No. JP-P-2004-54607A

SUMMARY OF THE DISCLOSURE

The industrial standard file access protocol such as NFS or CIFS is originally designed, assuming that it is used in a network environment such as a LAN (local Area Network) in which a short time response can be expected at a time of a data access. For this reason, when the industrial standard file access protocol is used in a network environment such as a WAN (Wide Area Network) or the Internet, in which a comparatively longer response time is required, the usability would be greatly reduced.

In order to prevent reduction of the usability by such a longer response time, an approach to arranging a cache server for caching once accessed data in the vicinity of a client can also be employed, thereby reducing the response time.

However, data generally handled by the cache server is the data such as Web contents dedicated to reading. Thus, it is difficult to support updating of data using the protocol such as NFS or CIF. Assume that a lot of sites for users who handle a file is scattered in comparatively distant locations and that a plurality of cache servers is also present in the sites. Then, when a request for updating the file is generated, the file for which updating is to be performed must be notified to each of the cache servers and then it must be determined whether to really update the data or not so as to maintain consistency of the data. For this reason, when a user makes access, a lot of communication between the sites will be generated, thereby also affecting the response time for a file access request by the user. As a result, the usability may be reduced.

Accordingly, an object of the present invention is to provide a system, a method, a device, and a program that allows reduction of a response time required for a file access and allows improvement in usability of a user.

The present invention achieves the object described above and also makes it an object thereof to provide a system, a method, a device, and a program that allow virtual unification of a plurality of storage resources of file servers scatted in sites and can provide the virtually unified storage resource from a plurality of clients installed in the respective sites.

The above and other objects are achieved by a system according to one aspect of the present invention which comprises:

a plurality of storage devices connected to one another through a network for communication;

means for analyzing an access context of a data object disposed in at least one of said plurality of storage devices and determining whether to rearrange said data object in another one of said plurality of storage devices; and means for migrating said data object disposed in said one of said plurality of storage devices to said another one of said plurality of storage devices, responsive to the determination as to rearrangement.

The storage system according to a second aspect of the present invention, preferably comprises means for performing control so that said data object is replicated from said one storage device to said another storage device based on a read context of said data object, and rendering said data object replicated in said another storage device into a real data object when a write operation is performed on said data object replicated in said another storage device.

A storage system according to a third aspect of the present invention comprises:

at least one client;

a plurality of file servers connected to the client through a network, each of said file servers including a storage device, for providing a response to a request from the client; and control means for deriving an access context of data in one of said plurality of storage devices, accessed from the client, migrating to another one of said storage devices provided in the vicinity of the client, the data whose access context satisfies a migration condition defined in advance, and for performing rearrangement of the data.

Preferably, in the storage system according to a fourth aspect of the present invention, said control means performs control so as to hide migration of the data to the client.

Preferably, in the storage system according to a fifth aspect of the present invention, said control means comprises a switch device logically disposed between the client and each of the file servers; said switch device comprising:

means for unifying storage resources of the file servers; and data migration means for performing the rearrangement of data among the file servers with data access service to the client not stopped.

Preferably, in the storage system according to a sixth aspect of the present invention, said switch device includes:

means for associating an execution log for each type of operation with regard to at least one of a data reading request, a data updating request, a data delete request, and a name changing request among requests from the client with at least one of a date and time when the operation has been executed, a name of a user who has executed the operation, a name or an address of a client that has executed the operation, a name or an address of a file server that has executed the operation, and a pathname of a file on which the operation has been executed, for storage in storage means; and means for deriving the access context of the file or a directory from the stored execution log.

Preferably, in the storage system according to a seventh aspect of the present invention, said control means comprises means for deriving the access context of a file and/or a directory accessed by a user or a group based on access log information and information on the user or the group to which the user belongs.

Preferably, in the storage system according to an eighth aspect of the present invention, each of a plurality of sites different to one another includes the client, the file server, and the switch device; said switch device comprising:

means for performing cooperation for accessing the same visualized storage resource through said switch device in each of said sites; and means for sharing information on the access context derived from each of the switch devices.

Preferably, in the storage system according to a ninth aspect of the present invention, based on log information on a file access, said means for deriving the access context changes a point and a weighting factor per the access according to the type of the operation on the file and information at a time when the operation is performed, and calculates the access context having a value in accordance with a characteristic of the file indicating whether the file is being currently created or the file has been already completed.

A system according to a 10th aspect of the present invention includes:

at least one client; and a switch device logically, disposed between said client and at least one server which includes a storage device, said switch device providing said client with a file access virtually unifying a plurality of storage devices;

said switch device obtaining log information on the file access from said client to one of said storage devices; and said storage system further comprising:

means for determining data to be migrated from said one of said storage devices to another one of said storage devices, based on the log information and a predetermined rule for determining an object to be migrated.

Preferably, in the storage system in accordance with an 11th aspect of the present invention, when obtaining a log on the file access, the switch device, obtains contents of an operation executed by the client as well, as the log. When the access context of the file access is calculated, the access context is calculated by identifying the type of the operation. The switch device may be configured to include means for calculating the access context of a file and/or a directory for each user or each group according to the characteristic of the file indicating whether the file is being created and may be frequently updated or whether the file is an already completed file to which a read request alone may be made, thereby preferentially extracting the file or the directory estimated to have the highest chance of being used.

Preferably, in the storage system in accordance with a 12th aspect of the present invention, said switch device provides to said client a plurality of file systems of a plurality of servers under said switch device or other switch device connected to said switch device through communication means as a unified storage resource.

Preferably, in the storage system in accordance with a 13th aspect of the present invention, said switch device transfers to the server managing the object a request about an object transmitted from said client;

a response about the request from the server is transferred to said client that has transmitted the request;

when an original object ID generated by the server is included in the transferred response so as to identify the object, server identification information for identifying the server managing the object corresponding to the original object ID from other server is included, thereby rewriting the original object ID; and said storage system includes means for restoring the rewritten object ID to the original object ID when the rewritten object ID is included in the transferred request.

Preferably, in the storage system in accordance with a 14th aspect of the present invention, said switch device comprises a pseudo file system managed as one consolidated directory tree obtained by combining directory trees of a plurality of file systems of a plurality of servers under said switch device or other switch device connected to said switch device through communication means, said a pseudo file system storing and managing information on a joint of the directory trees in said consolidated directory tree.

A storage system in accordance with a 15th aspect of the present invention, comprises a plurality of sites connected to one another through a network. Each of said plurality of sites comprises:

at least one client;

a switch device logically disposed between the client and at least one server including a storage device, for providing to the client a file access virtually unifying a plurality of storage devices; and an analysis device connected to the switch device; wherein the switch device receives log information on the file access from the client;

the analysis device comprises means for determining data to be migrated from the storage device of the server in another one of said sites different from one of said sites to which the client belongs to the server in said one of said sites to which the client belongs or in an other one of said sites in the vicinity of said one of said sites to which the client belongs and commanding the switch device to migrate the data, based on the file access log information;

the switch device migrates the data from the storage device of the server in said another one of said sites to the storage device of said one of said sites to which the client belongs or said other one of said sites in the vicinity of said one of said sites to which the client belongs, based on the command from the analysis device.

Preferably, in the storage system in accordance with a 16th aspect of the present invention, said analysis device receives log information on a file access by the client in the switch device;

based on a point according to a type of a file access operation and weight information to be multiplied by the point and defined according to a time condition indicating how long ago from a current time the file access has been performed, the analysis device obtains the log information on the file access to the server as numeric data;

the analysis device checks a numeric data value of the log information against a migration condition defined in a rule, and when the numeric data value of the log information satisfies the migration condition, the analysis device commands the switch device to migrate a file and/or a directory for the file access from the storage device of the server to the storage device of the server in a local system to which the client belongs; and the switch device migrates the file and/or the directory to the storage device of the local system to which the client belongs based on the command from the analysis device.

Preferably, in the storage system in accordance with a 17th aspect of the present invention, in case a log of delete request of the file targeted for calculation of a point thereof is present at a time of calculation of the numeric data and the log information indicating the same pathname and a name of the file is not present after said log of the delete request, the analysis device performs control so as not to count the point of the file regarding the log of delete request.

Preferably, in the storage system in accordance with an 18th aspect of the present invention, when a log of name changing request is present for the file targeted for point calculation at a time of calculation of the numeric data, the analysis device handles a log before a name change and a log after the name change as the log for the same file, and performs the point calculation using a new name.

Preferably, in the storage system in accordance with a 19th aspect of the present invention, the switch device comprises:

a packet processing unit that receives a file access request packet transmitted from the client and a file access response packet transmitted from the server to extract data in the packets;

a file access management unit for determining and managing processing of the data extracted by the packet processing unit;

an object ID rewriting unit for performing processing of incorporating a server identifier of the server storing the data into an object identifier of an object, said object identifier being included in a file access protocol for identifying a file and/or a directory generated by the server, so as to determine by the switch device in which server the object is stored, said object ID rewriting unit restoring the object identifier with the server identifier incorporated thereinto to an original object identifier generated by the server;

a file system complementing processing unit for reconstituting data to be transmitted to the client and the server based on the data on the file access protocol from the file access management unit;

a pseudo file system disposed in each of the sites, for managing a unified configuration of a plurality of file systems;

a data migration processing unit for performing data migration in each of the sites and between the sites and changing information in the file system complementing processing unit and the pseudo file system so as to hide an operation of executing the data migration from the client before and after the data migration; and a log selection unit for extracting information required as a log from the data in accordance with the file access protocol obtained from the file access management unit.

Preferably, in the storage system in accordance with a 20th aspect of the present invention, said analysis device comprises:

a log storage unit for storing the log information extracted from the log selection unit of the switch device;

a log forming unit for forming log information for calculating an access context from the log information stored in the log storage unit and calculating information on the access context; and a data migration commanding unit for determining data to be rearranged based on the information on the access context calculated by the log forming unit and commanding the data migration processing unit of the switch device to migrate the data to be rearranged.

Preferably, in the storage system in accordance with a 21st aspect of the present invention, said analysis device performs the extraction of a migration candidate from the log information, by one of the extraction of the migration candidate using an access context for each file, based on a user, the extraction of the migration candidate using an access context for each directory, based on the user, the extraction of the migration candidate using an access context for said each file, based on a group; and the extraction of the migration candidate using an access context for said each directory, based on the group is performed.

Preferably, in the storage system in accordance with a 22nd aspect of the present invention, the rule includes:

a point given to a log indicating one reading operation or one updating operation;

a weight to be multiplied by the point according to an execution time of the operation; and a condition for a file or a directory to be migrated.

Preferably, in the storage system in accordance with a 23rd aspect of the present invention, the rule includes a time period of log information analysis and an operation of migrating the file or the directory.

Preferably, in the storage system in accordance with a 24th aspect of the present invention, said analysis device calculates a total sum of values of logged operations targeted by file accesses, thereby rendering the file access log information to numeric data, each value thereof being obtained by multiplying a number of the operations targeted by the file accesses from the client by a point and then multiplying the result by a weight defined according to an execution time of the operations.

Preferably, in the storage system in accordance with a 25th aspect of the present invention, said analysis device includes means for determining a file and/or a directory with data thereof not migrated to the server in an other one of said sites from the storage device of the server in said one of said sites to which the client belongs, based on the log information on the file access.

Preferably, in the storage system in accordance with a 26th aspect of the present invention, when the same migration candidate data is extracted from the analysis devices in a plurality of said sites, the migration is performed based on a priority level assigned to each of said sites and/or each of regions of the storage device, or the migration is performed to one of said sites located intermediate said sites.

Preferably, the storage system in accordance with a 27th aspect of the present invention, further comprises means for variably controlling a period for execution of data rearrangement to each of said sites according to a predetermined evaluation value on said each of said sites.

Preferably, in the storage system in accordance with a 28th aspect of the present invention, execution or non-execution of data rearrangement to at least one of said sites is selectable.

Preferably, in the storage system in accordance with a 29th aspect of the present invention, a predetermined evaluation value on each of said sites is an amount of money for a file access service charge paid at said each of said sites.

In an environment such as an NAS or a file server for the usage of file data, a response time is not reduced just by caching data in the vicinity of a user. The storage destination of data itself is rearranged in a storage device in the vicinity of the user: the data is not arranged as cached data, which is temporary data, and the data itself is arranged. With this arrangement, at a time of a file access by the user, site-to-site communication required for holding consistency of the data is reduced, so that the response time is further reduced.

According to the present invention, in regard to the operation of changing the storage destination of the data, the switch device for virtually unifying a plurality of the storage resources of the file servers, as described in Patent Documents 1 and 2, is utilized. Further, switch devices and the file servers are deployed in the sites.

In the present invention, the switch device may be configured to include:

means for unifying conventional storage resources; and data migration (migration) means for allowing rearrangement of the data of a file with data access service to a client not stopped. In addition to these means, the switch device may be configured to include:

means for associating each of execution logs of four types of access requests from a user with a date and time when an operation has been performed, the name of the user who has executed the operation, the name of the client that has executed the operation (when it is unknown, the IP address of the client), the name of a file server that has executed the operation (when it is unknown, the IP address of the file server), and the pathname of the file on which the operation has been performed, for storage so as to keep track of the usage status of the data, the four types of access requests being classified according to the type of the operation and including a data reading request, a data updating request, a data delete request, and data name changing request;

means for calculating the access context of the file accessed by the user from one of the execution logs; and means for calculating the access context of a directory accessed by the user from the pathname described in the one of the execution logs.

In the present invention, the switch device may also be configured to include:

means for calculating the access context of a file accessed by a group based on the log information and information on the group to which a user belongs; and means for calculating the access context of a directory accessed by the group based on the log information and the information on the group to which the user belongs.

In the present invention, the switch device may also be configured to include:

interconnection means for accessing the same virtualized storage resource from the switch device in each of the sites; and means for sharing information on the access context calculated by the switch device.

In the present invention, it may also be so arranged that the means for deriving the access context changes a weighting factor for calculating the access context (score) for each operation such as a file reading operation or a file updating operation, and calculates the access context in accordance with the characteristic of the file indicating whether the file is being currently created or the file has been already completed by the user.

A method according to another aspect (30th) of the present invention is a method for managing data arrangement of a storage system including a plurality of storage devices connected through a network. The method includes the steps of:

analyzing an access context of a data object disposed in at least one of said plurality of storage devices and determining whether to rearrange the data object in another one of said plurality of storage devices; and migrating the data object in said one storage device to said another storage device, responsive to the determination as to rearrangement.

Preferably, in the method in accordance with a 31st aspect of the present invention, the data object is replicated from said storage device to said another storage device based on a read context of the data object; and the data object in said another storage device is rendered into a real data object when a write operation is performed on said data object.

A method according to a 32nd aspect of the present invention is a method for managing data arrangement of a storage system including:

at least one client; and a plurality of file servers connected to the client through a network and each including a storage device, said method comprising the steps of:

deriving an access context of data in one of said storage devices accessed from the client; and migrating to one of said storage devices in the vicinity of the client the data satisfying a migration condition defined in advance by the access context, thereby performing data rearrangement.

Preferably, in the method in accordance with a 33rd aspect of the present invention, the migration of the data is hidden to the client.

A method according to a 34th aspect of the present invention is a method for managing data arrangement of a storage device including: at least one client; and a switch device logically disposed between the client and at least one server including a storage device, for providing to the client a file access virtually unifying a plurality of storage devices. The method comprises the steps of:

obtaining log information on the file access from the client to one of said storage devices, by said switch device; and determining data to be migrated from said storage device to another storage device based on the log information obtained by said switch device and a predetermined rule for determining an object to be migrated, by an analysis device.

Preferably, in the method in accordance with a 35th aspect of the present invention, said switch device obtains contents of an operation executed by said client, as the log information on the file access;

said switch device calculates the access context of the file by identifying a type of an operation of the file access and changing a weighting factor used for the calculation of the access context according to information at a time when the operation is performed;

said switch device calculates the access context of a file and/or a directory for each user or each group according to a characteristic of the file indicating whether the file is being created and may be frequently updated or whether the file is an already completed file to which a read request alone may be made; and said switch device preferentially extracts the file or the directory estimated to have a relatively high chance of being used later than a current point.

A method in accordance with a 36th aspect of the present invention, is a method for managing data arrangement of a storage system, in which a plurality of sites of said storage system being connected to one another through a network, each of said sites including:

at least one client;

a switch device logically disposed between the client and at least one server including a storage device, for providing to the client a file access implemented by virtually unifying a plurality of storage devices; and an analysis device connected to the switch device.

The method comprises the steps of:

receiving log information on the file access from the client, by the switch device;

determining data to be migrated from the storage device of the server in another one of said sites different from one of said sites to which the client belongs to the server in said one of said sites to which the client belongs or in an other one of said sites in the vicinity of said one of said sites to which the client belongs and commanding the switch device to migrate the data, based on the file access log information, by the analysis device; and migrating the data based on the command from the analysis device, by the switch device.

Preferably, in the method in accordance with a 37th aspect of the present invention, said analysis device receives log information on a file access by the client in the switch device;

based on a point according to a type of a file access operation and weight information to be multiplied by the point and defined according to a time condition indicating how long ago from a current time the file access has been performed, the analysis device obtains the log information on the file access to the server as numeric data;

when the numeric data value of the log information satisfies a migration condition defined in the rule, the analysis device commands the switch device to migrate a file and/or a directory targeted for the file access from the server to the storage device of the server in a local system to which the client belongs; and the switch device migrates the data based on the command from the analysis device, and the client accesses the migrated file and/or directory through the switch device.

Preferably, in the method in accordance with a 38th aspect of the present invention, when a log of delete request of the file targeted for calculation of a point thereof is present at a time of calculation of the numeric data and the log information indicating the same pathname and a name of the file is not present after the log of the delete request, the analysis device does not count the point of the file regarding the log of the delete request.

Preferably, in the method in accordance with a 39th aspect of the present invention, when a log of name changing request is present for the file targeted for point calculation at a time of calculation of the numeric data, the analysis device handles a log before a name change and a log after the name change as the log for the same file, and performs the point calculation using a new name.

Preferably, in the method in accordance with a 40th aspect of the present invention, when a migration candidate is extracted from the log information, one of the extraction of the migration candidate using an access context for each file, based on a user, the extraction of the migration candidate using an access context for each directory, based on the user, the extraction of the migration candidate using an access context for said each file, based on a group; and the extraction of the migration candidate using an access context for said each directory, based on the group is performed.

Preferably, in the method in accordance with a 41st aspect of the present invention, a rule which is for specifying a data migration condition, includes:

a point given to a log indicating one reading operation or one updating operation;

a weight to be multiplied by the point according to an execution time of the operation; and a condition for a file or a directory to be migrated.

Preferably, in the method in accordance with a 42nd aspect of the present invention, a time period of log information analysis and an operation of migrating the file or the directory is included.

Preferably, in the method in accordance with a 43rd aspect of the present invention, said analysis device calculates a total sum of values of logged operations targeted by file accesses, thereby rendering the file access log information to numeric data, each value thereof being obtained by multiplying a number of the operations targeted by the file accesses from the client by a point and then multiplying the result by a weight defined according to an execution time of the operations.

Preferably, in the method in accordance with a 44th aspect of the present invention, said analysis device determines a file and/or a directory with data thereof not migrated to the server in an other one of said sites from the storage device of the server in said one of said sites to which the client belongs, based on the log information on the file access.

Preferably, in the method in accordance with a 45th aspect of the present invention, a plurality of switch devices provide to the client a plurality of file systems of a plurality of servers under each of said switch devices as a unified storage resource.

Preferably, in the method in accordance with a 46th aspect of the present invention, the switch device includes a pseudo file system managed as one consolidated directory tree obtained by combining directory trees of said file systems; and information on a joint of the directory trees in said consolidated directory tree is stored and managed.

Preferably, in the method in accordance with a 47th aspect of the present invention, when the same migration candidate data is extracted from the analysis devices in a plurality of said sites, the migration is performed based on a priority level assigned to each of said sites and/or each of regions of the storage devices, or the migration is performed to one of said sites located intermediate said sites.

Preferably, in the method in accordance with a 48th aspect of the present invention, a period for execution of data rearrangement to each of said sites is adjusted according to a predetermined evaluation value on said each of said sites.

Preferably, in the method in accordance with a 49th aspect of the present invention, execution or non-execution of data rearrangement to at least one of said sites is selectable.

Preferably, in the method in accordance with a 50th aspect of the present invention, the predetermined evaluation value on each of said sites is an amount of money for a file access service charge paid at said each of said sites.

A controller according to a 51st aspect of the present invention includes:

a switch device logically disposed between at least one client and at least one server which includes a storage device, for providing to the client a file access virtually unifying a plurality of storage devices; and an analysis device connected to the switch device;

wherein the switch device receives log information on the file access from the client;

the analysis device comprises means for determining data to be migrated from the storage device of the server in a site different from a site to which the client belongs to the server in the site to which the client belongs or in a site in the vicinity of said site to which the client belongs and commanding the switch device to migrate the data, based on the file access log information obtained by the switch device; and the switch device migrates the data from the storage device of the server in said another one of said sites to the storage device of said one of said sites to which the client belongs or said other one of said sites in the vicinity of said one of said sites to which the client belongs, based on the command from the analysis device.

Preferably, in the controller in accordance with a 52nd aspect of the present invention, said analysis device receives log information on a file access by the client in the switch device;

based on a point according to a type of a file access operation and weight information to be multiplied by the point and defined according to a time condition indicating how long ago from a current time the file access has been performed, the analysis device obtains a log on the file access to the server as numeric data;

when a value of the numeric data of the log information satisfies a migration condition defined in a rule, the analysis device commands the switch device to migrate a file and/or a directory targeted for the file access from the server to the storage device of the server in a local system to which the client belongs; and the switch device migrates the data based on the command from the analysis device, and the client accesses the migrated file and/or directory through the switch device.

A computer program according to a 53rd aspect of the present invention is a program for causing a computer constituting control means of a storage system to perform the processings of:

analyzing an access context of a data object disposed in at least one of a plurality of storage devices connected to one another through communication means and determining whether to rearrange the data object in another storage device of said plurality of storage devices; and migrating the data object in said one storage device to said another storage device, responsive to the determination as to rearrangement.

A computer program according to a 54th aspect of the present invention is a program for causing a computer constituting a controller to execute processing, said controller including:

a switching module logically disposed between at least one client and at least one server including a storage device, for providing to the client a file access implemented by virtually unifying a plurality of storage devices; and an analysis module for calculating information on a file access by the client.

The processing comprises steps of:

receiving log information on the file access from the client by the switching module;

determining data to be migrated from the storage device of the server in a site different from a site to which the client belongs to the server in the site to which the client belongs or in a site in the vicinity of said site to which the client belongs and commanding the switching module to migrate the data, based on the file access log information obtained by the switching module; and migrating the data from the storage device of the server in said another site to the storage device of said site to which the client belongs or said other one of said sites in the vicinity of said one of said sites to which the client belongs, based on the command from the analysis module, by the switching module.

Preferably, the computer program in accordance with a 55th aspect of the present invention, executes processing of:

receiving log information on a file access by the client obtained by the switching module, by the analysis module;

obtaining the log information on the file access to the server as numeric data by the analysis module, based on a point according to a type of a file access operation and weight information to be multiplied by the point and defined according to a time condition indicating how long ago from a current time the file access has been performed; and commanding the switching module to migrate a file and/or a directory targeted for the file access from the server to the storage device of the server in a local system to which the client belongs by the analysis module when the numeric data value of the log information satisfies a migration condition defined in the rule.

Preferably, in the computer program in accordance with a 56th aspect of the present invention, when a of delete request of the file targeted for calculation of a point thereof is present at a time of calculation of the numeric data and the log information indicating the same pathname and a name of the file is not present after the log of delete request, the analysis module does not count the point of the file regarding the log of delete request.

Preferably, in the computer program in accordance with a 57th aspect of the present invention, when a log of name change request is present for the file targeted for point calculation at a time of calculation of the numeric data, the analysis module handles a log before a name change and a log after the name change as the log for the same file, and performs the point calculation using a new name.

Preferably, the computer program in accordance with a 58th aspect of the present invention, executes processing of performing control so that a period for execution of data rearrangement in each of said sites is adjusted according to a predetermined evaluation value on said each of said sites.

Preferably, the computer program in accordance with a 59th aspect of the present invention, execute processing of performing control so that execution or non-execution of data rearrangement in at least one of said sites is selectable.

Preferably, in the computer program in accordance with a 60th aspect of the present invention, the predetermined evaluation value on each of said sites is an amount of money for a file access service charge paid at said each of said sites.

The meritorious effects of the present invention are summarized as follows.

By using the switch device to which the present invention has been applied, the plurality of storage resources of the file servers scattered in the sites can be provided from a plurality of clients installed in the sites as the virtually unified storage resource.

Further, by the means for obtaining the log information associated with an operation request from the client and the means for identifying file reading or data updating from the log information, thereby calculating the access context, the access context of a file and/or a directory for each user or each group is calculated according to the characteristic of the file indicating whether the file is being created and may be frequently updated or whether the file is an already completed file to which a read request alone may be made. The file having the highest chance of being used is thereby estimated. Then, by migrating data to the file server in the site of the client used by the user or the group, the response time required for an access to the file can be reduced, and usability of the user can be improved.

Still other objects and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 3 is a diagram showing an example of a rule set in the analysis device in the embodiment of the present invention;

FIG. 4 is a table showing an example of an analysis result calculated by the analysis device in the embodiment of the present invention;

FIG. 5 is a diagram showing an example of the rule set in the analysis device in the embodiment of the present invention;

FIG. 6 is a table showing an example of an analysis result calculated by the analysis device in the embodiment of the present invention;

FIG. 7 is a diagram showing a still other example of the rule set in the analysis device in the embodiment of the present invention;

FIG. 8 is a table showing an example of an analysis result calculated by the analysis device in the embodiment of the present invention;

FIG. 9 is a table showing an example of an analysis result calculated by the analysis device in the embodiment of the present invention;

FIG. 10 is a diagram showing an example of the rule set in the analysis device in the embodiment of the present invention;

FIG. 11 is a table showing an example of an analysis result calculated by the analysis device in the embodiment of the present invention;

FIG. 13 is a table showing an example of an analysis result calculated by the analysis device in the embodiment of the present invention.

PREFERRED EMBODIMENTS OF THE INVENTION

Figure 1:
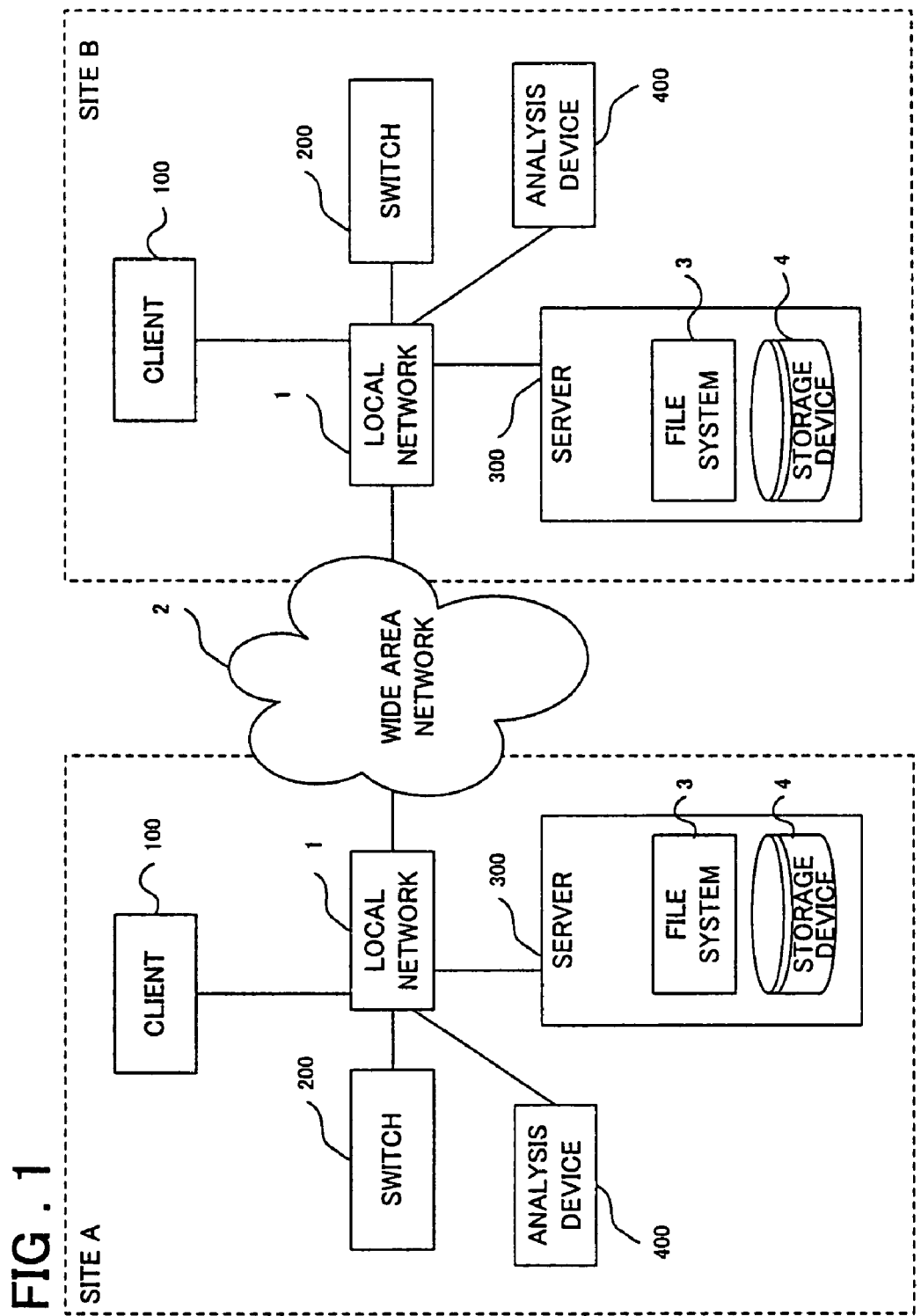
FIG. 1 is a diagram showing a system configuration of an embodiment of the present invention.

A system configuration according to a best mode for carrying out the present invention will be described with reference to drawings. FIG. 1 shows the system configuration according to an embodiment of the present invention. The system according to the present embodiment of the present invention comprises, at least, two clients 100, two switch devices 200, two servers 300, and two analysis devices 400. The respective devices are distributed in at least two sites. Each site comprises, at least, one client 100, one switch device 200, one server 300, and an analysis device 400, and they are connected to a local network 1 such as a LAN. The local network 1 is connected to a wide area network 2 such as a WAN (Wide Area Network) or the Internet, thereby making it possible to perform communication between the local networks 1 in the respective sites.

The server 300 includes a file system 3 and a storage device (storage device) 4, and through a file access protocol such as NFS or CIFS, an external device can access data stored in the file system 3 and the storage device (storage device) 4 managed by the server 300.

The client 100 uses the file access protocol such as NFS or CIFS, and makes access to the data managed by the server 300 through the switch device 200.

In the present embodiment, when the client 100 performs communication extending over the sites, the client 100 always performs the communication through the switch device 200.

The switch device 200 in each site provides the clients 100 in local and remote sites with the unified file access services to the intra-site (within a site) and inter-site the file system to.

Figure 2:
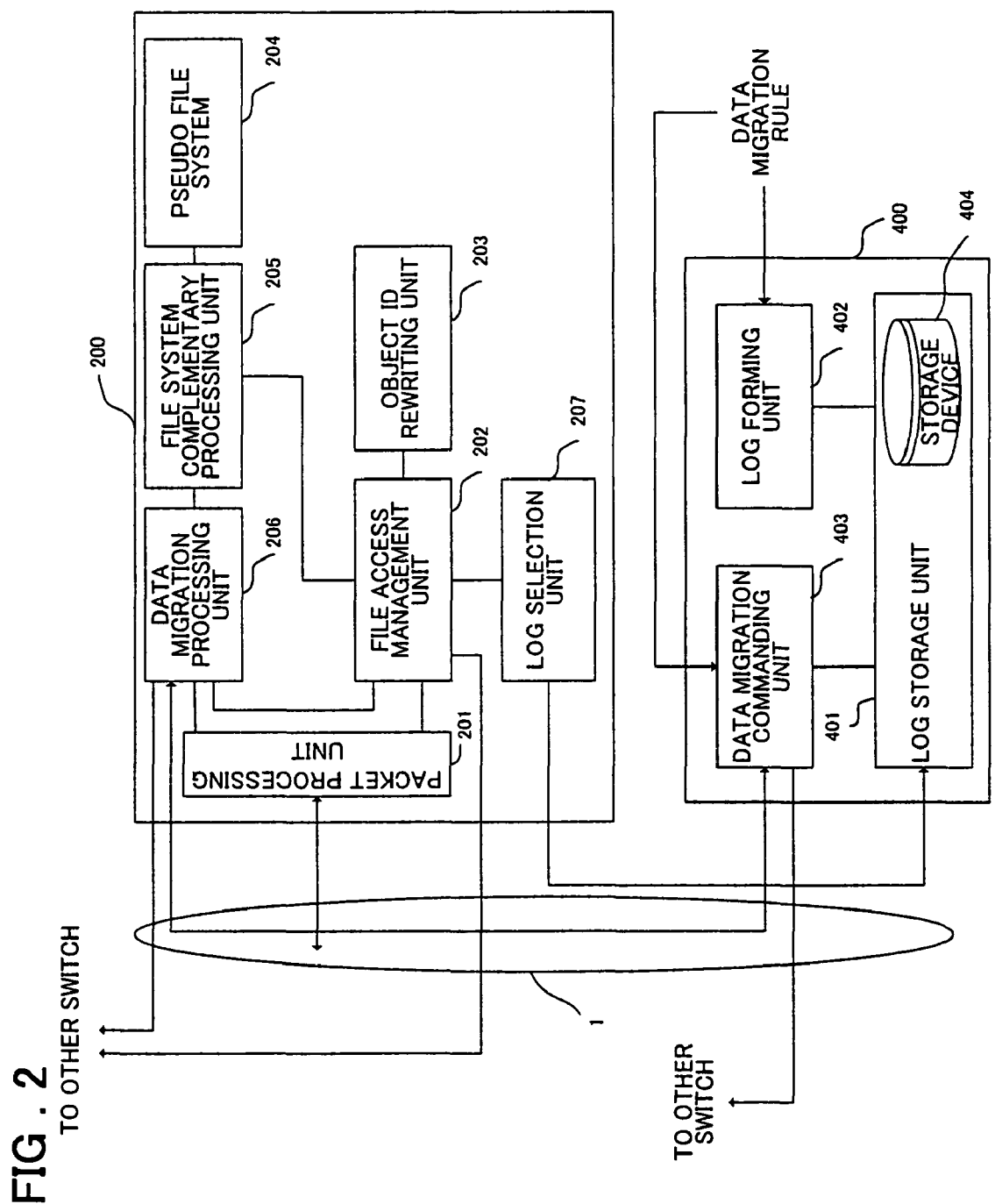
FIG. 2 is a diagram showing configurations of a switch and an analysis device in the embodiment of the present invention.

FIG. 2 is a diagram showing an example of internal configurations of the switch device 200 and the analysis device 400. Referring to FIG. 2, the switch device 200 comprises a packet processing unit 201, a file access management unit 202, an object ID rewriting unit 203, a pseudo file system 204, a file system complementing processing unit 205, a data migration processing unit 206, and a log selection unit 207. On receipt of a file access request packet transmitted from the client 100 and a file access response packet transmitted from the server 300, the packet processing unit 201 extracts data in the respective packets. The file access management unit 202 determines and manages processing of the data extracted by the packet processing unit 201. In order for the switch device 200 itself to determine in which server an object of an object identifier generated by the server 300 and included in the file access protocol, for identifying a file or a directory, is stored, the object ID rewriting unit 203 performs an operation of incorporating the identifier of the server storing the data into the object identifier and an operation of restoring the object identifier with the identifier of the server incorporated thereinto to the original object identifier generated by the server 300. In order to unify the file systems 3 managed by the servers 300, the file system complementing processing unit 205 reconstructs data to be transmitted to the client 100 and the server 300 based on the data in accordance with the file access protocol, transmitted from the file access management unit 202. The pseudo file system 204 manages the unified configuration of the file systems. The data migration processing unit 206 executes data migration between the file systems or the servers 300 and changes information in the file system complementing processing unit 205 and the pseudo file system 204 in order to hide an operation of execution of the data migration from the client 100 before and after the data migration. The log selection unit 207 extracts only data that will become necessary as a log from the data in accordance with the file access protocol, obtained from the file access management unit 202.

The analysis device 400 comprises a log storage unit 401, a log forming unit 402, and a data migration commanding unit 403. The log storage unit 401 stores the log extracted from the log selection unit 207 of the switch device 200. The log forming unit 402 calculates information such as an access context (access context) from data on the log stored in the log storage unit 401 and forms the log data before the calculation of the access context. The data migration commanding unit 403 plans data rearrangement based on the information such as the access context calculated by the log forming unit 402 and commands the data migration processing unit 206 of the switch device 200 to migrate the data.

The log storage unit 401 includes a storage device 404. The log data transmitted from the switch device 200, the access context (such as data obtained by rendering log information for a file access to numeric data) calculated by the log forming unit 402, and the formed log data are stored in the storage device 404.

In the present embodiment, the switch device 200 and the analysis device 400 are of separate device configurations. Data transmission and reception are performed through the local network 1. The switch device 200 and the analysis device 400 do not always need to be of the separate device configurations, and may be configured as one device. Functions of the analysis device 400, for example, may be incorporated into the switch device.

In the present embodiment, in an environment where the file systems 3 of the servers 300 dotted in the sites are seen to be unified to the client 100 of each of the sites through the switch devices 200, a file access request from the client 100 that has passed through the switch device 200 is left as the log data. Then, in the analysis device 400, frequently used file data of the client 100 in each of the sites is obtained from the log data, using a certain criterion. The frequently used file data of the client 100 is autonomously moved to the server 300 in the site to which the client 100 belongs.

<File Access Log Acquisition Procedure>

First, a procedure for acquiring a log for data in accordance with the file access protocol exchanged between the client 100 and the server 300 through the switch device 200 will be described.

A data portion in the packet of a file access request transmitted from the client 100 is extracted by the packet processing unit 201 of the switch device 200 and is then transferred to the file access management unit 202. Then, a copy of data analyzed by the file access management unit 202 is transferred to the log selection unit 207.

In the data, an execution ID for identifying the operation request thereof, the type of the operation request such as a read or a write, the name of the client that has transmitted the request (if the name of the client is not known, the IP address of the client), the name of a user who executes the request, a pathname targeted for the operation request (or the name of a file or the object identifier of the file), and the name of the server to which the request is to be transmitted (if the name of the server is not known, the IP address of the server) are included. If the operation request has been the request for changing the name of the object, the names of two paths for the operation request before and after the change of the object name are included.

A data portion in the packet of a file access response returned from the server 300 is extracted by the packet processing unit 201 of the switch device 200 and transferred to the file access management unit 202. Then, a copy of the data analyzed by the file access management unit 202 is transferred to the log selection unit 207. The data includes an execution ID for identifying an operation to be performed thereon and information indicating a success of the request or not.

The log selection unit 207 selects only operation requests which are classified into four kinds such as a file reading request, a file writing request, a file deletion request, and a file name changing request in order to determine the usage status of the file by the user, or leave an operation status when the user actually and intentionally makes access to the file as the log. Then, using the execution ID for identifying the operation, consistency of request data with response data is checked, and only the data that shows the success of the operation is registered as the log.

The log selection unit 207 associates the date and time when the operation has been executed (or the date and time when the data has been obtained from the file access management unit 202), the name of the client that has transmitted the request (if the name of the client is not known, the IP address of the client), the name of the user who has executed the request, the name of the path targeted for the operation (or the name of the file or the object identifier of the file), and the name of the server that has transmitted the object (if the name of the server is not known, the IP address of the server) with information on each request for the operation, and generates the log.

The log generated by the log selection unit 207 is periodically transferred to the log storage unit 401 of the analysis device 400, and stored in the storage unit 404.

Based on the log data collected as described above, a transition to an operation of extracting a file or a directory which will become a candidate for data migration according to a rule determined by a manager in advance (which will be described later) is made.

<Method of Extracting Migration Candidate from Log Data>

When extracting a migration candidate from the log data in the present embodiment, candidate selections using the following four units can be performed:

(a) extraction of the migration candidate for each file based on an operation user;

(b) extraction of the migration candidate for each directory based on the operation user;

(c) extraction of the migration candidate for each file based on an operation group;

(d) extraction of the migration candidate for each directory based on the operation group.

In the selection (a) described above, using only the log data that has a one-to-one association between the operation user and the file targeted for the operation as an information source, the migration candidate is extracted. On the other hand, in the selections (b), (c), and (d) described above, directory hierarchy information and group information of a site to which the user belongs are utilized as the information source, and the migration candidate is thereby extracted.

By extracting the migration candidate based on the group, data can be extracted of which the access context has become extremely high in fact due to constant accesses by all users of the group, though individual access contexts are not so high. Further, by extracting the migration candidate for each directory, even if data is stored in the server outside the site to which a certain user belongs, not accessed usually, the data that may be accessed in the future can be cannily migrated to the site to which the user belongs, due to the property of a directory hierarchical structure into which files associated with the data are integrated.

<Procedure for Extracting Access Context and Migration Candidate for Each File Based on Operation User>

First, a procedure for calculating the access context of each file from logs stored in the log storage unit 401 and then determining a file subjected to the migration, based on the operation user in the selection (a) will be described.

It is assumed that a rule 500 as shown in FIG. 3 for determining an object to which file data is to be migrated is registered in advance in the data migration commanding unit 403 and the log forming unit 402 in the analysis device 400 by the manager.

The rule 500 stipulates a point to be given to a log indicating one reading operation (READ) or an updating operation (WRITE), weights each by which the point is multiplied according to the date and time when the operation has been executed, a requirement for the file subjected to migration (whether a total point resulting from the multiplication by the weight satisfies this requirement), and an execution time of log data analysis and the operation of migrating the file data (data rearrangement). In the rule 500 in FIG. 3, the points for the READ and the WRITE are set to 0.1 and 1, respectively, weights according to the time during which the operation has been executed are set to ×1000, ×100, ×10, and ×1 for 0 to 3 days, 4 to 7 days, 8 to 30 days, and 1 to 3 months, respectively. As the requirement for the file subjected to the migration, 100 points or more is set, and the execution time from 1:00 to 5:00 every day is stipulated. The points, weights, requirement, and execution time shown in the rule 500 in FIG. 3 are only an example, and according to the environment to which the present invention is applied, the manager determines respective parameters.

With regard to assignment of the points for the READ and the WRITE among the parameters, by setting the point for the WRITE to a larger value than the point for the READ, for example, the file being created by the user can be subjected to the migration for preference. Further, by setting the point for the READ to a larger value than the point for the WRITE, the file completed by the user can be subjected to the migration for preference.

The log forming unit 402 of the analysis device 400 reads out the log data from the log storage unit 401, and calculates the point for each access to each file accessed by each user (or client) according to the rule 500 and generates the analysis result of the access contexts of file accesses, as shown in an example of an analysis result 501 in FIG. 4.

In the analysis result of the access contexts, the name of a target user or a target client (when they are unknown, the IP address of the target user or target client), the pathname of a file to which the user has made an operation request (or the name of the file or the object identifier of the file), and the name of the server of a transmission destination (when the server is not known, the IP address of the server) are described.

In the case of the rule 500, point calculation formulas for calculating the access context of a certain file by a "User A" are as follows:

(the number of times of READs by the User $A$ 10 to 3 days before)×0.1=$R1$ (the number of times of WRITEs by the User $A$ 0 to 3 days before)×1=$W1$ (the number of times of READs by the User $A$ 4 to 7 days before)×0.1=$R2$ (the number of times of WRITEs by the User $A$ 4 to 7 days before)×1=$W2$ (the number of times of READs by the User $A$ 8 to 30 days before)×0.1=$R3$ (the number of times of WRITEs by the User $A$ 8 to 30 days before)×1=$W3$ (the number of times of READs by the User $A$ 1 to 3 months before)×0.1=$R4$ (the number of times of WRITEs by the User $A$ 1 to 3 months before)×1=$W4$ (the point of the certain file in User $A$)=($R1$+$W1$)×1000+($R2$+$W2$)×100+($R3$+$W3$)×10+($R4$+$W4$)×1

At the time of calculation of this point (score), when a log (history) requesting deletion of the certain file targeted for the point calculation is present irrespective of the operation user and log information indicating the same pathname as that for the certain file and the same file name as that of the certain file is not present after the log requesting the deletion, the analysis result of the certain file will not be counted into the analysis result.

When a log (history) requesting change of the name (pathname) of a certain file targeted for the point calculation is present irrespective of the operation user, the log with the name of the file before the change and the log with the name of the file after the change are treated as the log of the same file. The point calculation is then performed using the new name.

The log data of a certain file targeted for the point calculation with the name of the server to which the request has been transmitted (when the name of the server is not known, the IP address of the server) different from the name of the server described in the latest log of the file will not be used for the point calculation, irrespective of the operation user.

In the case of the rule 500 in FIG. 3 and the example of the analysis result 501 in FIG. 4, when the server 300 located in the same site as that of the analysis device 400 that has calculated the analysis result is a "Server A" and the server 300 located in other site is a "Server B", the file that finally remains as the candidate for the data migration (migration from the "Server B" to the "Server A") becomes a "/Dir/File4" of the "Server B".

A "/test/test3" file, which is located on the "Server A" and is not therefore the candidate for the data migration, exceeds the requirement for the file subjected to the migration in the rule 500. Accordingly, even if the file is listed as the migration candidate in other site, the data of the file is considered to be the data not eligible for the migration, of which migration to the other site is not performed.

After the log forming unit 402 has generated the analysis result 501 concerning all operation users registered in the logs and has extracted a candidate for the data migration, the log forming unit 402 stores in the log storage unit 401 the generated analysis result 501, the pathname of the file of the migration candidate, and the pathname of a file not eligible for the migration as data.

<Procedure for Extracting Access Context and Migration Candidate for Each Directory Based on Operation User>

Next, a procedure for extracting the access context of each directory from the logs stored in the log storage unit 401 and determining a directory subjected to the migration based on the operation user, in the selection (b) will be described.

It is assumed that a rule 502 as shown in FIG. 5 for determining an object to which directory data is to be migrated is registered in advance in the data migration commanding unit 403 and the log forming unit 402 in the analysis device 400 by the manager.

The same parameters as those of the rule 500 are listed in the rule 502. In place of the requirement for the file subjected to the migration, a requirement for the directory subjected to the migration is described in the rule 502. Likewise, the parameters shown in the rule 502 in FIG. 5 are only an example, and the manager determines the respective parameters according to the environment to which the present invention is applied.

The log forming unit 402 of the analysis device 400 reads the log data from the log storage unit 401, and calculates the point for each file accessed by each user (or client) according to the rule 502, as shown in the example of the analysis result 501 in FIG. 4, as in the case of the selection (a) described above.

Further, the log forming unit 402 of the analysis device 400 analyzes data on the pathnames of the analysis result 501, totalizes points for each directory, and generates an analysis result 503 as shown in an example in FIG. 6. Totalization of the points for each directory is obtained by adding points of directory entries under the each directory, and point calculations are sequentially made from the directory in the lowest layer to the directory in the highest layer.

In the case of the rule 502 in FIG. 5 and the example of the analysis result 503 in FIG. 6, when the server 300 located in the same site as that of the analysis device 400 that has calculated the analysis result is the "Server A" and the server 300 located in other site is the "Server B", the directory that finally remains as the candidate for the data migration (migration from the "Server B" to the "Server A") becomes a "/Dir" of the "Server B". The directory not eligible for the migration becomes a "/sample" of the "server A".

After the log forming unit 402 has generated the analysis result 501 concerning all the operation users registered in the logs and the analysis result 503 concerning directories and has extracted a candidate for the data migration, the log forming unit 402 stores in the log storage unit 401 the generated analysis results 501 and 503, the pathname of the directory of the migration candidate, and the pathname of a directory not eligible for the migration.

<Procedure of Extracting Access Context and Migration Candidate for Each File Based on Operation Group>

Next, a procedure for extracting the access context of each file from the logs stored in the log storage unit 401 and determining a file subjected to the migration based on the operation group, described in the selection (c) will be described. The group of the operation group is obtained by grouping sites to which the users (or clients) belong.

It is assumed that a rule 504 as shown in FIG. 7 for determining an object to which file data is to be migrated is registered in advance in the data migration commanding unit 403 and the log forming unit 402 in the analysis device 400 by the manager.

In addition to the same parameters as those of the rule 500, sites and the name of the users (or the names of the clients or IP addresses of the users or the clients) who belong to the sites are registered in the rule 504 as parameters. The parameters shown in the rule 504 in FIG. 7 are only an example, and the manager determines the respective parameters according to the environment to which the present invention is applied.

The log forming unit 402 of the analysis device 400 reads out the log data from the log storage unit 401, and calculates the point for each file accessed by each user (or client) according to the rule 504, as shown in the examples of analysis results 501 (of the user A) and 506 (of a user B) in FIG. 8, as in the case of the selection (a) described above.

Further, using the analysis results 505 and 506 of all the users who belong to the group, the log forming unit 402 of the analysis device 400 adds up points of files having the same pathname, thereby generating an analysis result 507 as shown in an example in FIG. 9.

In the case of the rule 504 in FIG. 7 and the example of the analysis result 507 in FIG. 9, when the server 300 located in the same site as that of the analysis device 400 that has calculated the analysis result is "Server A" and the server 300 located in other site is "Server B", the files that finally remain as the candidates for the data migration become:

"/test/test3"
"/Dir/File4"
"/Dir/File5"
"/sample/sample 1" and
"/sample/sample 2".

The file not eligible for the migration becomes "/test/test3".

After the log forming unit 402 has generated the analysis results 505 and 506 concerning all the operation users registered in the logs and the analysis result 507 concerning the operation group and has extracted a candidate for the data migration, the log forming unit 402 stores in the log storage unit 401 the generated analysis results 505, 506, and 507, the pathname of the file of the migration candidate, and the pathname of a file not eligible for the migration.

<Procedure of Extracting Access Context and Migration Candidate for Each Directory Based on Operation Group>

Next, a procedure for extracting the access context of each directory from the logs stored in the log storage unit 401 and determining a directory subjected to the migration based on the operation group, described in the selection (d) will be described.

It is assumed that a rule 508 as shown in FIG. 10 for determining an object to which directory data is to be migrated is registered in advance in the data migration commanding unit 403 and the log forming unit 402 in the analysis device 400 by the manager.

The same parameters as those of the rule 504 are described in the rule 508. In place of the requirement for the file subjected to the migration, a requirement for the directory subjected to the migration is described in the rule 508.

Likewise, the parameters shown in the rule 508 in FIG. 10 are only an example, and the manager determines the respective parameters according to the environment to which the present invention is applied.

The log forming unit 402 of the analysis device 400 reads out the log data from the log storage unit 401, and calculates the point for each file accessed by each user (or client) according to the rule 508, as shown in the examples of analysis results 505 and 506 in FIG. 8, as in the case of the selection (a) described above.

Further, the log forming unit 402 of the analysis device 400 adds up points of files having the same pathname to generate the analysis result 507, using the analysis results 505 and 506 of all the users who belong to the group. Further, the log forming unit 402 of the analysis device 400 analyzes data on the pathnames of the analysis result 507, totalizes points for each directory, and generates an analysis result 509 as shown in an example in FIG. 11. Totalization of the points for each directory is obtained by adding up points of respective directory entries, and point calculations are sequentially made from the directory in the lowest layer to the directory in the highest layer.

In the case of the rule 508 in FIG. 10 and the example of the analysis result 509 in FIG. 11, when the server 300 located in the same site as that of the analysis device 400 that has calculated the analysis result is "Server A" and the server 300 located in other site is "Server B", the directories that finally remain as the candidates for the data migration become:

"/Dir" and

"/sample"

There are no files not eligible for the migration.

After the log forming unit 402 has generated the analysis results 505 and 506 concerning all the operation users registered in the logs, the analysis result 507 concerning the operation group, and the analysis result 509 concerning the directories and has extracted a candidate for the data migration, the log forming unit 402 stores in the log storage unit 401 the generated analysis results 505, 506, 507, and 509, the pathnames of the directory of the migration candidate, and the pathnames of a directory not eligible for the migration.

Using the four analysis approaches described above, the analysis device 400 installed in each site extracts a candidate for the migration based on the rule set for the device. The analysis approach in which the format of an extracted object (such as the file or the directory) becomes identical will be used in all the analysis devices 400. The parameters in the rule set for the analysis device 400 in each site should be set according to the level of importance of each site (indicating that a constantly high file access is demanded, or the like), and do not always need to be identical. However, the time for executing the operations of the analysis and file migration should be set to the same time range in all sites.

As described above, based on the rule set for the analysis device 400 installed in each site, the migration candidate is extracted, and in conjunction with an interconnected operation among a plurality of the switch devices 200, which will be described next, the operation will be passed on to the operation of the data migration.

<Procedure for Interconnected Operation Among Switches>

As preknowledge for performing an interconnected operation among the switch devices 200 and providing to the client 100 the file systems 3 of the servers 300 under the switch devices 200 as an integrated storage resource, a description will be given below about an operation procedure for providing the file systems of the servers to the client 100 as the integrated storage resource when the switch device 200 alone is operated.

First, through the switch device 200, the client 100 performs mounting on the storage resource consolidated by the pseudo file systems 204 in the switch devices 200, and obtains the initial object identifier defined on the file access protocol so as to specify an object such as a file or a directory.

The object identifier is the one in which the switch device 200 incorporates a server identifier indicating the address of the server 300 into the object identifier generated by the server 300. The server identifier is associated with the address information of the server (such as the IP address or the server name), and is registered in the file access management unit 202.

In the present embodiment, the name of the object identifier generated by the server 300 is defined to be the server object identifier, while the name of the object identifier into which the switch device 200 has incorporated the server identifier is defined to be a switch object identifier.

Further, when the client 100 accesses the integrated storage resource using the file access protocol, the client 100 specifies an object to be operated using the switch object identifier, and accesses a file or a directory.

Figure 12:
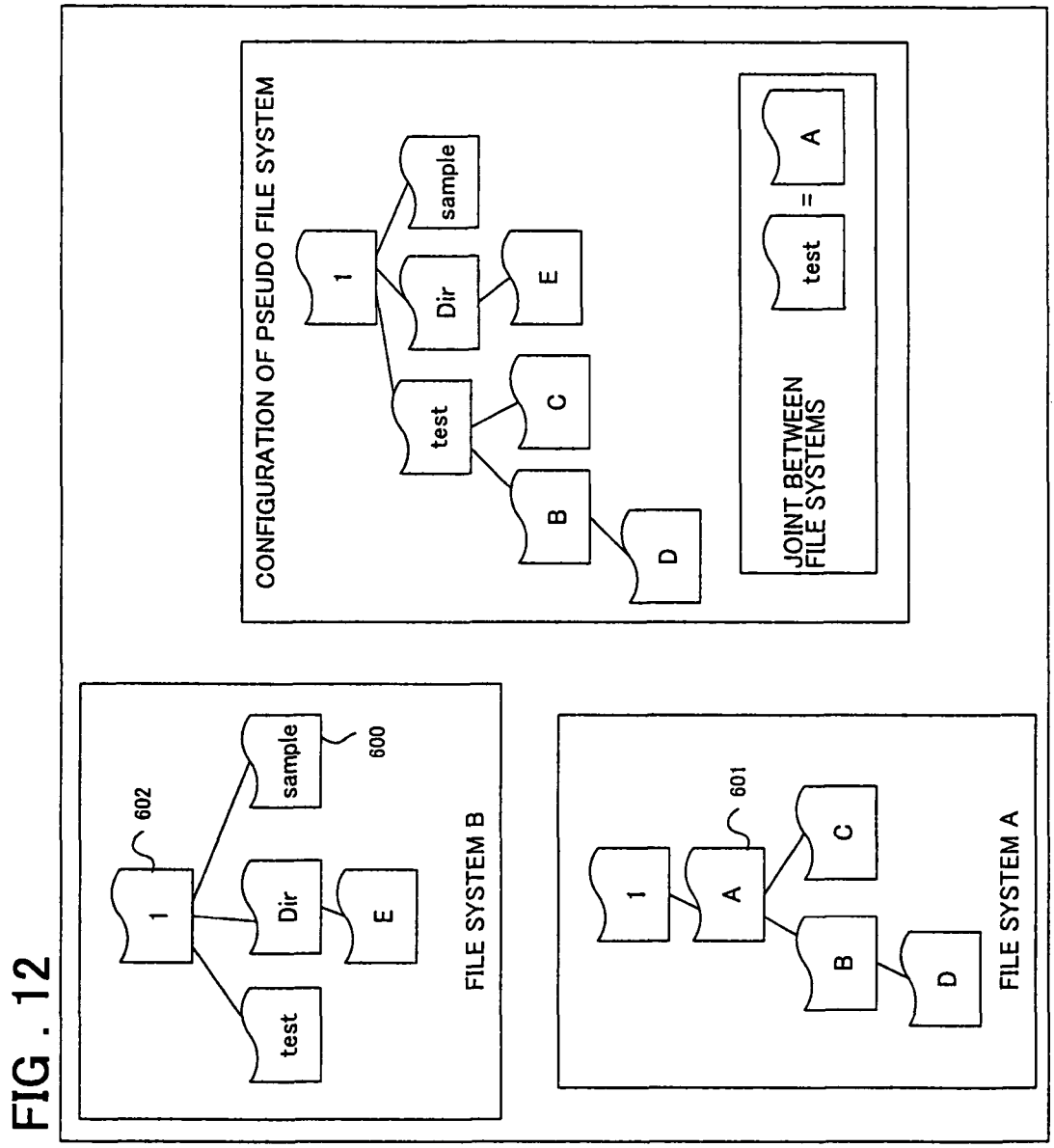
FIG. 12 includes diagrams showing an example of a configuration of a pseudo file system in the embodiment of the present invention.

As in a configuration example of the pseudo file system shown in FIG. 12 where two file systems are consolidated, the pseudo file system 204 manages information for combining directory trees in the file systems of the servers to constitute as one directory tree. In the case of the example in FIG. 12, the information described before includes the server object identifiers of directories each of which serves as a joint between two directory trees (such as a directory A601 of a file system A and a directory test of a file system B), pathnames from route directories (names of directories) on each file system, the server object identifier of a parent directory 602 for the joint, and information on a server (such as the IP address and the name of the server) that stores each directory.

As described above, data in the joint of the directory trees managed by the pseudo file system 204 is extremely smaller than the information quantity of the file systems as a whole. When the switch device 200 is started, the data is read out from the pseudo file system 204 and is registered in the file access management unit 202.

A description will be directed to a procedure for making a file access to the storage resource by the client 100. In the procedure, an operation request transmitted from the client 100 is transmitted to the server 300 through the switch device 200 and a response is returned from the server 300 to the client 100 through the switch device 200 again under preconditions described above.

All data included in a file access request packet transmitted from the client 100 to the switch device 200 is extracted by the packet processing unit 201 and sent to the file access management unit 202.

The file access management unit 202 transfers the switch object identifier to the object ID rewriting unit 203, thereby extracting the server identifier and the server object identifier. Then, the file access management unit 202 determines the server 300 of a transfer destination from server address information associated with the server identifier of the server to which the file access request is to be transferred.

In preparation for a response from the server 300, the file access management unit 202 associates an identifier (an execution ID) for identifying the request included in the file access request with the IP address of the client 100 or the name of the client that has transmitted the request, and registers the associated result in the file access management unit 202. By comparing the server object identifier, the name of a directory targeted for an operation included in the file access request, with information on the server object identifier and the name of the directory of the joint of the pseudo file systems, registered in the file access management unit 202, the file access management unit 202 determines whether the request is the request for the operation on the joint of a plurality of file systems.

When it is determined that the request is not the one for the operation on the joint, the packet processing unit 201 generates the file access request packet in which a data change from the switch object identifier to the server object identifier has been performed, transmits the request packet to the server 300 in which the data is to be stored, indicated by the server identifier, and waits for the response from the server 300.

When it is determined that the request is the one for the operation on the joint, in order to make the joint of the directory trees consistent so as to look as if it were the same as a directory in an ordinary tree, individual accesses are made to data managed on two file systems constituting the joint, respectively, to determine whether there is the need for taking out data or not, according to the contents of the operation such as the write or the read included in the file access request transmitted from the client 100.

When it is determined that there is no need for making the individual accesses to the data managed on the two file systems constituting the joint to extract the data, the file access management unit 202 transfers the file access request packet in which the change from the switch object identifier to the server object identifier has been performed to the server 300 in which the data is to be stored, indicated by the server identifier, and waits for the response, as in the file access request to the directory other than the joint.

When it is determined that there is a need for making the individual accesses to the data managed on the two file systems constituting the joint to extract the data, the file access management unit 202 transfers to the file system complementing processing unit 205 the contents of the operation of the request from the client and the server object identifiers and server address information associated with the two directories constituting the joint. Then, the new file access request for extracting the required data from the two file systems is generated, the execution ID of the request is registered in the file access management unit 202, the request is transferred to the servers of the two file systems for storage through the packet processing units 201, and responses are waited for.

When the packets indicating the responses are transmitted from the servers 300, the data included in the packets are extracted by the packet processing unit 201 and sent to the file access management unit 202.

The file access management unit 202 extracts the execution IDs from the data, identifies the client 100 that has transmitted the request, and converts the server object identifiers to the switch object identifiers by the object ID rewriting unit 203 when the server object identifiers are included in the data.

After the file access management unit 202 has identified the client 100 that has transmitted the request, the file access management unit 202 gives data on the responses to the packet processing unit 201, thereby returning responses for file accesses to the client 100.

When the file access management unit 202 has received the data on the responses and then found that the execution ID was issued by the file access management unit 202 itself, or when requests for obtaining the data from a plurality of file systems is made for the file access request from the client to the joint on the pseudo file system 204, the file system complementing processing unit 205 synthesizes the data on the responses, if necessary, so that they are consistent as the joint, thereby generating the response data for the file access request when all of the responses associated with the file access request from the client have returned.

After the response data has been generated, the file access management unit 202 searches for the execution IDs of the file access request from the client associated with the response date, and determines the client to which transfer is to be made. Then, the file access management unit 202 transfers the response on the file access request to the client through the packet processing unit 201.

As described above, the file access request by the client and the response by the server are transferred through the switch device 200. However, in order to provide the same consolidated storage resource (directory tree) to the clients 100 in respective sites when the switch devices 200 are installed in a plurality of sites, as shown in FIG. 1, it is necessary to share the data of the same pseudo file system among the switch devices 200 in the respective sites.

Further, when the transfer destination of the request from the switch device 200 is the server 300 that is present in the site other than the site in which the switch device 200 is disposed, it is necessary to transfer the request to the other site.

Since the pseudo file system 204 is not changed unless the operation of data rearrangement by the switch device 200 is performed, the location (IP address or the like) of the switch device 200 in other site is normally registered in the switch device 200 in advance before the switch device 200 is started, and information on the same pseudo file system 204 is set. When the switch device 200 is started, by performing communication with the other switch device 200 of which registration has been performed through the file access management unit 202, it is confirmed that settings of the pseudo file system 204 registered in the switch device 200 itself are the same as those of the pseudo file system 204 registered in other switch device 200. Alternatively, as other approach to sharing the pseudo file system, the switch device 200 that will become the parent switch device 200 may be determined in advance. Then the approach may be used in which, from the switch device 200 that will become the parent, the switch devices 200 other than the parent switch device obtains set data in the pseudo file system at the time of the start.

Communication between the sites concerning a file access is all performed among the switch devices 200. Thus, when setting the pseudo file system 204 at the time of the start, among three data including the server object identifier of a directory corresponding to the joint of directory trees installed in a plurality of file systems on the pseudo file system 204, the pathname (name of the directory), and the address information (the IP address or the server name) of the server in which the directory is stored, in regard to the server address information of the directory stored in the server 300 in other site, the switch device 200 in each site stores the address information (the IP address or the switch name) of the switch device 200 installed in the other site to which the server 300 belongs, as set data.

With regard to the address information (the IP address or the server name) of the server associated with the server identifier included in the switch object identifier as well, if the server is stored in the server 300 in other site, the address information (the IP address or the server name) of the switch device 200 installed in the other site to which the server 300 belongs is associated with the server identifier included in the switch object identifier.

As described above, when the file access request from the client 100 is received by the switch device 200 and the server address information associated with the server identifier obtained from the switch object identifier in data on the file access request is the address information of the switch device 200 in other site, the file access request is transferred from the file access management unit 202 to switch device 200 in the other site, based on the address information. Even when the switch device 200 has received from other site the file access request extending over the sites, processing is executed as in the case of the file access request from the client 100 within the site.

Next, virtualization of NAS among sites will be described. In NFS, site information (management information based on a file handle) is added to the pseudo file system 204, and the same pseudo file system is held in all the sites. In the case of packet transfer by the NFS, for example, site determination is performed using an identifier in the file handle. For the transfer of an NFS packet, in the case of the identifier of the site to which the switch device 200 itself belongs, the switch device 200 transfers the NFS packet to the NAS in the site to which the switch device 200 belongs. In the case of the identifier of other site, the switch device 200 transfers the NFS packet to the switch device 200 in the other site. On the other hand, in the case of a CIF, the site information (management information based on pathnames) is added to the pseudo file system 204 of file virtualization management information, and the same virtualization management information (such as the pseudo file system 204) is shared by the switch devices 200 in all sites. In transfer of a CIFS packet, the switch device 200 performs identification by using the pathnames. In the case of the pathname managed in the site to which the switch device 200 belongs, the switch device 200 transfers the CIF packet to the NAS of the site to which the switch device 200 belongs. In the case of the pathname managed in other site, the switch device 200 transfers the CIF packet to the switch device 200 of the other site.

<Data Migration Procedure>

Next, a procedure for performing data rearrangement among sites based on information on a data migration candidate extracted from log data will be described.

Each of the sites has the analysis device 400. One of these analysis devices 400 is set to the parent analysis device 400 in advance. Other analysis device 400 in each of the sites transfers data of the data migration candidate to the parent analysis device 400, and the parent analysis device 400 determines data to be finally migrated. In the description that will be given below, it is assumed that the analysis device 400 in a site A in FIG. 1 is set to the parent analysis device 400.

It is assumed that the approach of the selection (d) described above is employed as the approach to extracting the candidate. It is also assumed that the analysis result 509 in FIG. 11 is calculated by the analysis device 400 in the site A using the rule in FIG. 10, so that the directories that become the candidates for data migration are "/Dir" and "/sample". It is further assumed that in the analysis device 400 in a site B, the analysis result 510 in FIG. 13 is calculated, the directory that is the data migration candidate is "/test", and the directory not eligible for the data migration is "/sample".

The analysis device 400 in the site A waits for transmission of the analysis result from the analysis device 400 in the site B after data migration candidate extraction from the log data has been finished.

After the data migration candidate extraction has been finished, the analysis device 400 in the site B transmits the analysis result 510, the pathname of the directory that is the data migration candidate, and the pathname of the directory not eligible for the data migration to the analysis device 400 in the site A that is the parent analysis device through the data migration commanding unit 403.

The data migration commanding unit 403 in the analysis device 400 in the site A checks the analysis result 509 against the analysis result 510, and checks the migration candidate directories and the directories not eligible for the migration determined by the analysis devices 400 in the respective sites. The data migration commanding unit 403 extracts only the migration candidates eligible for the migration, and determines that "/Dir" should be migrated from the server 300 in the site B to the server 300 in the site A, and that "/test" should be migrated from the server 300 in the site A to the server 300 in the site B.

Further, the data migration commanding unit 403 of the analysis device 400 in the site A inquires the data migration processing unit 206 of the switch device 200 in the site A, obtains information on the pseudo file system 204, checks the information against information on the configuration of the current pseudo file system, and determines the destination of the migration.

Figure 14:
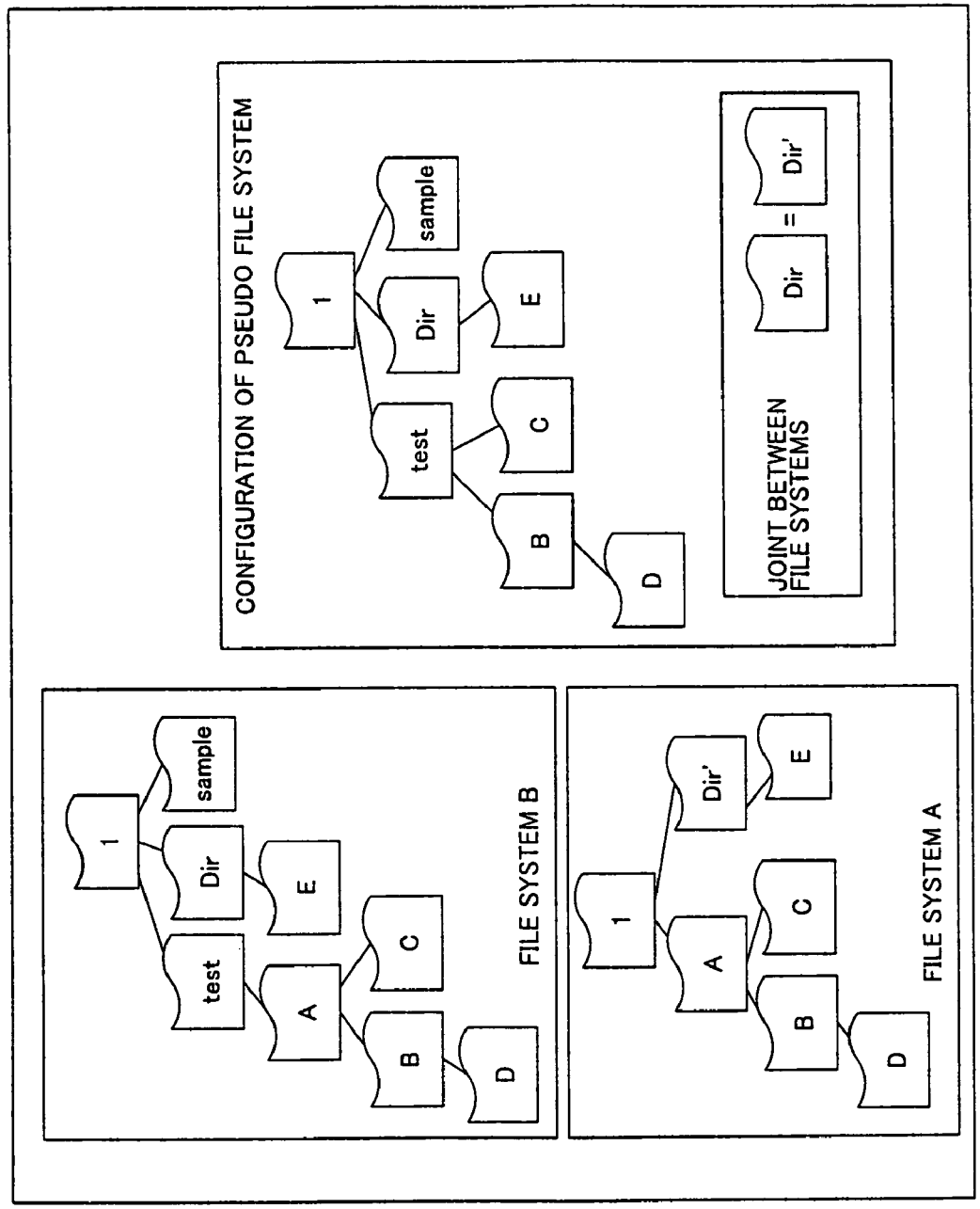
FIG. 14 includes diagrams showing an example of a configuration of a pseudo file system after data migration in the embodiment of the present invention.

When a state before the migration is the configuration of the pseudo file system in FIG. 12, the file system A is of a tree configuration of the file system 3 of the server 300 in the site A, and the file system B is of a tree configuration in the server 300 in the site B, configurations of data arrangement and the pseudo file system after the migration becomes the configurations in FIG. 14.

The directories of migration sources and migration destinations of which the migration has been determined are notified from the parent analysis device 400 in the site A to the analysis device 400 in the site B. Then, the operation will be passed on to the operation of the data migration.

The data migration is performed by the switch device 200 in each site. The switch device 200 takes charge of the operation of migrating data in the server 300 in the site to which the switch device 200 belongs to other site.

Accordingly, in the case of this example, the switch device 200 in the site A takes charge of migration of "/test", while the switch device 200 in the site B takes charge of migration of "/Dir".

Next, the data migration commanding unit 403 of the analysis device 400 in each site notifies information on a migration source and a migration destination assigned thereto to the data migration processing unit 206 of the switch device 200.

The data migration processing unit 206 that has received the information on the migration source and the migration destination from the data migration commanding unit 403 collects the server object identifier and the object name of an object under the server that becomes the migration source through the switch device 200 in the site in which this (migration source) server 300 is disposed, based on the received information, and makes the table format information on the server object identifier and the object name of the object.

Likewise, the switch device 200 in the site in which the (migration source) server 300 is disposed also makes table format information on the similar information.

After creation of the table format information has been finished, the data migration processing unit 206 reads data from a high-order directory in the migration source, and writes the data in the server 300 of the migration destination.

The data migration processing unit 206 that performs the operation of the migration at the time of data reading from the migration source and data writing to the migration destination associates the server object identifier of the object of the migration source with the server object identifier of the object of the migration destination and registers the result in the table format information.

After the data migration processing unit 206 that performs the operation of the data migration has performed the data migration operation described above on all migration target regions and finished the migration, the data migration processing unit 206 notifies the pseudo file system 204 of the switch device 200 in each site of updating so that the pseudo file system 204 has settings of the pseudo file system 204 in FIG. 14 after completion of the migration. Then, after completion of the updating, the data migration processing unit 206 deletes the migrated data in the server 300 of the migration source.

The table format information is employed when an access request is made from the client 100 to an object being migrated. When the request is made to the object targeted for the migration, the request is transferred to the switch device 200 that is executing the operation of the migration. When the object targeted for the migration is already migrated, the request is transferred to the server 300 of the migration destination. When the object targeted for the migration is in a state before the migration, the request is transferred to the server 300 of the transfer source. The request is transferred to the switch device 200 in the site in which the server 300 of the transfer source is disposed, and the response is waited for.

<Method of Determining Destination of Data Migration in the Case of System Configuration Using Three or More Sites>

In an example shown in FIG. 1, the number of sites is two. Thus, it can be uniquely determined whether a migration candidate extracted from the log data should be migrated or not. In case the number of the sites is three or more and a migration candidate is obtained from the analysis device 400 in each site, the same migration candidate may be extracted from a plurality of the analysis devices 400. In such a case, as a determination criterion as to which server 300 in which site data should be migrated, selection among the following approaches is performed as necessary:

1) A site with a large point calculated from the result of analysis is prioritized.

2) Priority ordering is performed on the sites in advance, and the site for the data migration is determined according to the level of priority.

3) Based on the geographical distances between the sites or an average response time, the data is disposed on the site which becomes the midpoint among the sites.

A description will be given about the approach 2) described above. In this case, the priority level may be changed for each of the sites, or the priority level may be changed for each specific data region, for example. In case the priority level is changed for each of the sites, the priority level of data arrangement is set for each of the sites. A point calculation factor may be determined for each of three sites A, B, and C, for example, according to the priority level of each of the sites, and a value obtained by multiplying the determined point value by the factor may be set to a final score. In case the priority level of the site is variably set for each region, the priority level is changed in a specific region (directory tree). When score totalization is performed, the factor is changed, for example.

Alternatively, when the sites have the same point, the site with the higher priority level is selected. Assume there are four directories /Dir1, /Dir2, /Dir3, and /Dir4 under a route directory /root of the storage device, and the three sites A, B, and C are present. Then, the following settings may be performed: the priority levels of the sites A, B, and C may be set to 1, 2, and 3 with respect to the /Dir1 (which means that when the same migration candidate /Dir1 is extracted in the sites, the site A has the highest priority level). The priority levels of the sites A, B, and C may be set to 2, 1, and 3 with respect to /Dir2 (which means that when the same migration candidate /Dir2 is extracted in the sites, the site B has the highest priority level). The priority levels of the sites A, B, and C may be set to 2, 3, and 1 with respect to the "/Dir3" (which means that when the same migration candidate /Dir3 is extracted in the sites, the site C has the highest priority level). The priority levels of the sites A, B, and C may be set to 1, 3, and 2 with respect to the /Dir4 (which means that when the same migration candidate /Dir4 is extracted in the sites, the site A has the highest priority level).

A description will be given about the approach 3) described above. When two sites having the same point are present in the approaches 1) and 2) described above, the midpoint site among the sites, for example, is selected so as to achieve optimization of the cost (such as the graphical distance or the average response time). When point differences among the sites are within a certain range, data may be migrated to the site which becomes the midpoint among a plurality of migration candidates.

<Setting of a Plurality of Service Levels Due to a Change in Data Rearrangement Period in Conjunction with Charge>

In the examples of the systems and the rules shown in FIGS. 1, 2, 5, 7, and 10, the execution time from analysis of log information to data rearrangement that will be the same in all of sites was set. A period for data rearrangement to at least one site or all of the sites may be variably set based on a predetermined evaluation value. As the evaluation value concerning the sites, the value of the usage amount of file access service may be employed. Specifically, the data migration commanding unit 403 of the analysis device 400 shown in FIG. 2 performs such control as to change the execution period of the operation of data rearrangement in the site in which the data migration commanding unit 403 is installed, according to a file access service usage charge to be paid in each site, for example. When the execution period of the operation of data rearrangement in the site in which the data migration commanding unit 403 is installed is changed according to the file access service usage charge to be paid in each site, the execution period of data rearrangement is set to a shorter period in the site in which much file access service usage charge has been paid, for example. Then, extraction of the candidate for the data rearrangement is performed shortly after a file access by the user has been made to perform the data rearrangement in the site in which the data migration commanding unit 403 is installed (or the site in which much file access service usage charge has been paid). A service environment capable of obtaining an immediate, high-speed access is thereby implemented. As described above, the period for the data rearrangement in the site in which the data migration commanding unit 403 is installed is changed according to the amount of money paid as the file access service usage charge. A plurality of service levels is set in stages from a service level environment in which no rearrangement operation is performed to a service level environment in which the period for execution of the operation of the data rearrangement is short.

The period for the execution time of the operation of the data rearrangement for each site differs according to the amount of money paid as the file access service usage charge. Thus, when providing these service levels, log information analysis, for example, is performed in all of the sites in accordance with the site in which the period for the data rearrangement is the shortest. Then, based on the result of analysis of the log information obtained in each site, it is so configured that extraction of the candidate for the data rearrangement and the operation of the data rearrangement are performed on only an object in the site in which the data rearrangement is to be performed.

According to the present invention, when sharing data among sites that are separated in distance, frequently used data can be automatically moved to a frequently used site, based on the characteristics of data (such as the one indicating whether a file is being created or has been already created) and the feature of the importance levels of the sites and using an approach to changing the weight for calculating the access context.

With this arrangement, creation of a file access environment with a faster response time can be automatically implemented, thereby improving usability of a file access operation. Further, even when a site to which the user belongs is changed due to a change in an organization, frequently used data is arranged near the user irrespective of a location in which the data is stored. Thus, a burden associated with the storage destination of the data can be eliminated, and the load of data management itself can be reduced.

Further, by changing the period for the data rearrangement, the creation interval of the file access environment with the fast response time can be controlled. By setting a plurality of file access service levels, the file access service in accordance with the paid charge can be provided.

Meanwhile, as an example of a variation of the present embodiment, the following control may be performed as the control over the data rearrangement based on the result of access context analysis. When an access for a read from a file (directory) disposed in the server 300 of the site A is made from the client 100 in the site B as the access context in FIG. 1, for example, control may be performed so that the file (directory) is replicated (copied) into the server 300 in the site B based on the context of the read, and the replicated file (directory) in the server 300 in the site B is rendered into a real file (directory) when an access for a write is made from the client 100 in the site B to the replicated file (directory) in the server 300 in the site B.

The foregoing description was given in conjunction with the embodiment described above. The present invention, however, is not limited to the configuration of the embodiment described above alone, and of course includes various variations and modifications that could be made by those skilled in the art within the scope of the present invention.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A storage system comprising:
at least one client;
a plurality of file servers connected to the client through a network, each of said file servers including a storage device, for providing a response to a request from the client; and
control means for deriving an access context of data in one of said plurality of storage devices accessed from the client, for migrating to another one of said storage devices provided in the vicinity of the client, the data whose access context satisfies a migration condition defined in advance, and for performing rearrangement of the data, wherein said deriving is performed using a plurality of types of operations, wherein said control means comprises a switch device logically disposed between the client and each of the file servers;
said switch device comprising:
means for unifying storage resources of the file servers;
data migration means for performing the rearrangement of data among the file servers with data access service to the client not stopped;
means for associating an execution log for each type of the types of operations with regard to a data reading request, a data updating request, a data delete request, and a name changing request among requests from the client with at least one of a date and time when the operation has been executed, a name of a user who has executed the operation, a name or an address of a client that has executed the operation, a name or an address of a file server that has executed the operation, and a pathname of a file on which the operation has been executed, for storage in storage means; and
means for deriving the access context of the file or a directory from the stored execution log,
wherein based on log information on a file access, said means for deriving the access context changes a point and a weighting factor per the access according to the type of the operation on the file and information at a time when the operation is performed, and calculates the access context having a value in accordance with a characteristic of the file indicating whether the file is being currently created or the file has been already completed.

2. The storage system according to claim 1, wherein said control means performs control to hide migration of the data to the client.

3. The storage system according to claim 2, wherein each of a plurality of sites different to one another includes the client, the file server, and a switch device;
said switch device comprising:
means for performing cooperation for accessing the same visualized storage resource through said switch device in each of said sites; and
means for sharing information on the access context derived from each of the switch devices.

4. A storage system comprising:
at least one client; and
a switch device logically disposed between said client and at least one server which includes a storage device, said switch device providing said client with a file access virtually unifying a plurality of storage devices;
said switch device obtaining log information on the file access from said client to one of said storage devices, said log information comprising a plurality of types of file access operations; and
said storage system further comprising:
means for determining data to be migrated from said one of said storage devices to another one of said storage devices in the vicinity of the client, based on the log information and a predetermined rule for determining an object to be migrated,
wherein said switch device obtains contents of an operation executed by said client as the log information on the file access;
wherein said switch device calculates an access context of the file access by identifying the type of the file access operation and changing a weighting factor used for calculation of the access context according to information at a time when the file access operation is performed; and
wherein said storage system calculates the access context of a file and/or a directory for each user or each of a group of users according to a characteristic of the file indicating whether the file is being created and may be frequently updated or whether the file is an already completed file to which a read request alone may be made, and preferentially extracting the file or the directory estimated to have a relatively high chance of being used later than a current point.

5. The storage system according to claim 4, wherein said switch device provides to said client a plurality of file systems of a plurality of servers under said switch device or other switch device connected to said switch device through communication means as a unified storage resource.

6. The storage system according to claim 4, wherein said switch device comprises a pseudo file system managed as one consolidated directory tree obtained by combining directory trees of a plurality of file systems, said pseudo file system storing and managing information on a joint of the directory trees in said consolidated directory tree.

7. A storage system, comprising a plurality of sites connected to one another through a network, each of said plurality of sites comprising:
   at least one client;
   a switch device logically disposed between the client and at least one server including a storage device, for providing to the client a file access virtually unifying a plurality of storage devices; and
   an analysis device connected to the switch device;
   the switch device receiving log information on the file access from the client, said log information comprising a plurality of types of file access operations;
   the analysis device comprising means for determining data to be migrated from the storage device of the server in another one of said sites different from one of said sites to which the client belongs to the server in said one of said sites to which the client belongs or in an other one of said sites in the vicinity of said one of said sites to which the client belongs and commanding the switch device to migrate the data, based on the file access log information;
   the switch device migrating the data from the storage device of the server in said another one of said sites to the storage device of said one of said sites to which the client belongs or said other one of said sites in the vicinity of said one of said sites to which the client belongs, based on the command from the analysis device,
   wherein said analysis device receives log information on a file access by the client in the switch device;
   based on a point according to the type of the file access operation and weight information to be multiplied by the point and defined according to a time condition indicating how long ago from a current time the file access has been performed and based on a characteristic of the file indicating whether the file is being currently created or the file has been already completed, the analysis device obtains the log information on the file access to the server as numeric data;
   the analysis device checks a numeric data value of the log information against a migration condition defined in a rule, and when the numeric data value of the log information satisfies the migration condition, the analysis device commands the switch device to migrate a file and/or a directory for the file access from the storage device of the server to the storage device of the server in a local system to which the client belongs; and
   the switch device migrates the file and/or the directory to the storage device of the local system to which the client belongs based on the command from the analysis device.

8. The storage system according to claim 7, wherein said analysis device calculates a total sum of values of logged operations targeted by file accesses, thereby rendering the file access log information to numeric data, each value thereof being obtained by multiplying a number of the operations targeted by the file accesses from the client by a point and then multiplying the result by a weight defined according to an execution time of the operations.

9. The storage system according to claim 7, further comprising means for variably controlling a period for execution of data rearrangement to each of said sites according to a predetermined evaluation value on said each of said sites.

10. The storage system according to claim 7, wherein a predetermined evaluation value on each of said sites is an amount of money for a file access service charge paid at said each of said sites.

11. A method for managing data arrangement of a storage device including:
    at least one client; and
    a switch device logically disposed between the client and at least one server including a storage device, for providing to the client a file access implemented by virtually unifying a plurality of storage devices, said method comprising the steps of:
    obtaining log information on the file access from the client to one of said storage devices, by said switch device, said log information comprising a plurality of types of file access operations; and
    determining data to be migrated from said storage device to another storage device in the vicinity of the client based on the log information obtained by said switch device and a predetermined rule for determining an object to be migrated, by an analysis device,
    wherein said switch device obtains contents of an operation executed by said client, as the log information on the file access;
    said switch device calculates the access context of the file by identifying the type of the file access operation and changing a weighting factor used for the calculation of the access context according to information at a time when the operation is performed;
    said switch device calculates the access context of a file and/or a directory for each user or each group according to a characteristic of the file indicating whether the file is being created and may be frequently updated or whether the file is an already completed file to which a read request alone may be made; and
    said switch device preferentially extracts the file or the directory estimated to have a relatively high chance of being used later than a current point.

* * * * *